United States Patent
Morris et al.

(10) Patent No.: US 6,799,263 B1
(45) Date of Patent: Sep. 28, 2004

(54) PREFETCH INSTRUCTION FOR AN UNPREDICTED PATH INCLUDING A FLUSH FIELD FOR INDICATING WHETHER EARLIER PREFETCHES ARE TO BE DISCARDED AND WHETHER IN-PROGRESS PREFETCHES ARE TO BE ABORTED

(75) Inventors: Dale C. Morris, Menlo Park, CA (US); James R. Callister, San Jose, CA (US); Stephen R. Undy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,361

(22) Filed: Oct. 28, 1999

(51) Int. Cl.[7] ............................................. G06F 9/40
(52) U.S. Cl. ..................... 712/207; 712/235; 712/237; 712/239; 711/119
(58) Field of Search ..................... 711/119; 712/207, 712/239, 236, 237, 238, 235, 233, 234

(56) References Cited

U.S. PATENT DOCUMENTS

| | | | |
|---|---|---|---|
| 5,742,804 A | * 4/1998 | Yeh et al. | 712/237 |
| 5,796,971 A | 8/1998 | Emberson | 712/207 |
| 5,828,860 A | 10/1998 | Miyaoku et al. | 712/207 |
| 6,055,621 A | 4/2000 | Puzak | 712/207 |
| 6,088,789 A | * 7/2000 | Witt | 711/113 |
| 6,164,840 A | * 12/2000 | Lynch | 711/125 |
| 6,212,603 B1 | * 4/2001 | McInerney et al. | 711/125 |
| 6,272,622 B1 | * 8/2001 | Han et al. | 712/237 |
| 6,308,242 B1 | * 10/2001 | Kim | 711/135 |
| 6,401,192 B1 | * 6/2002 | Schroter et al. | 712/207 |

FOREIGN PATENT DOCUMENTS

| | | | |
|---|---|---|---|
| EP | 0 810517 | 12/1997 | |
| WO | WO 97/36234 | * 10/1997 | G06F/12/08 |

\* cited by examiner

*Primary Examiner*—Eddie Chan
*Assistant Examiner*—Tonia L. Meonske
(74) *Attorney, Agent, or Firm*—David A. Plettner

(57) ABSTRACT

A method for prefetching instructions into cache memory using a prefetch instruction. The prefetch instruction contains a target field, a count field, a cache level field, a flush field, and a trace field. The target field specifies the address at which prefetching begins. The count field specifies the number of instructions to prefetch. The flush field indicates whether earlier prefetches should be discarded and whether in-progress prefetches should be aborted. The level field specifies the level of the cache into which the instructions should be prefetched. The trace field establishes a trace vector that can be used to determine whether the prefetching operation specified by the operation should be aborted. The prefetch instruction may be used in conjunction with a branch predict instruction to prefetch a branch of instructions that is not predicted.

20 Claims, 2 Drawing Sheets

PREFETCH INSTRUCTION FOR AN UNPREDICTED PATH INCLUDING A FLUSH FIELD FOR INDICATING WHETHER EARLIER PREFETCHES ARE TO BE DISCARDED AND WHETHER IN-PROGRESS PREFETCHES ARE TO BE ABORTED

CROSS REFERENCE TO RELATED APPLICATION

The present invention contains subject matter related to U.S. Pat. No. 5,742,804 to Yeh et al., which is entitled "Instruction Prefetch Mechanism Utilizing a Branch Predict Instruction". This patent is hereby incorporated by reference.

FIELD OF THE INVENTION

The present invention relates to the field of high performance computer processors, and more particularly, to the instruction set architecture of a processor and methods for improving programming flow.

DESCRIPTION OF THE RELATED ART

As the operating frequencies of processors continues to rise, performance often depends upon providing a continual stream of instructions and data in accordance with the computer program that is executing. As application programs continue to get larger, instruction fetch penalty has become one of the major bottlenecks in system performance. Instruction fetch penalty refers to the number of cycles spent fetching instructions from different levels of cache memories and main memory. Instruction prefetch is an effective way to reduce the instruction fetch penalty by prefetching instructions from long-latency cache memories or main memory to short-latency caches. Therefore, when instructions are actually required the fetch penalty of the instructions is small.

Since a prefetch needs to be performed before the program actually reaches the prefetch target, it is important for the instruction prefetch mechanism to acquire the correct instructions. One common prior art prefetch method is to simply have the processor prefetch instructions a certain number of instructions ahead of the current instruction being executed. While this works well for instructions that lie along a single execution path, a branch to another execution path renders useless the prefetched instructions occurring after the branch instruction.

As the art of computer design has progressed, there has been a trend to design processor mechanisms capable of finding ways to keep the functional units of a processor busy even when it is not certain that the work performed by the functional unit will be needed. For example, branch prediction allows execution along a predicted path to begin even though the condition tested by the branch instruction has not yet been determined. Initially, many of these techniques were provided solely by the processor hardware, and were invisible to the program being executed.

More recently, there has been a trend to expose these mechanisms to the program, and thereby allow compilers to generate program code that is capable of exploiting the mechanisms more efficiently. One such mechanism was disclosed in U.S. Pat. No. 5,742,804 to Yeh et al., which is entitled "Instruction Prefetch Mechanism Utilizing a Branch Predict Instruction" and was incorporated by reference above. Yeh et al. disclosed a branch prediction instruction that also prefetched instructions along the predicted path. Therefore, Yeh et al. allowed the prefetching mechanism of the processor to be exposed to the compiler to the extent that the compiler could direct prefetching activity associated with a predicted branch path.

SUMMARY OF THE INVENTION

The present invention provides a prefetch instruction for prefetching instructions into one or more levels of cache memory before the instructions are actually encountered in a programmed sequence of instructions, thereby minimizing instruction fetch penalty while making optimum use of memory bandwidth by only prefetching those instructions that are likely to be needed. According to one embodiment of the invented method, a prefetch instruction is executed. The prefetch instruction is defined by an opcode that specifies a target field and a count field. A block of target instructions, starting at the target address and continuing until the count is reached, is prefetched into the instruction cache of the processor so that the instructions are available for execution prior to the execution of the instruction specified by the target address. In other embodiments, the prefetch instruction of the present invention includes a cache level field, a flush field, and a trace field. The trace field specifies a vector of a path in the program sequence that leads from the prefetch instruction to the target address, and allows the prefetch operation to be aborted if the vector is not taken. The cache level field specifies the level of the cache memory into which the instructions are to be prefetched. Finally, the flush field indicates whether all preceding prefetch operations should be discarded.

Architecturally, the prefetch instruction is effectively a "no-operation" (NOP) instruction, and has no effect on program execution other than providing performance benefits. The present invention exposes the prefetch mechanism of the processor to the compiler, thereby increasing performance. By allowing the compiler to schedule appropriate prefetch instructions, the present invention reduces latency by increasing the likelihood that instructions will be in the cache when they are executed, while reducing cache pollution and conserving bandwidth by only prefetching instructions that are likely to be executed.

DETAILED DESCRIPTION OF THE PREFERRED EMBODIMENTS

Figure 1:
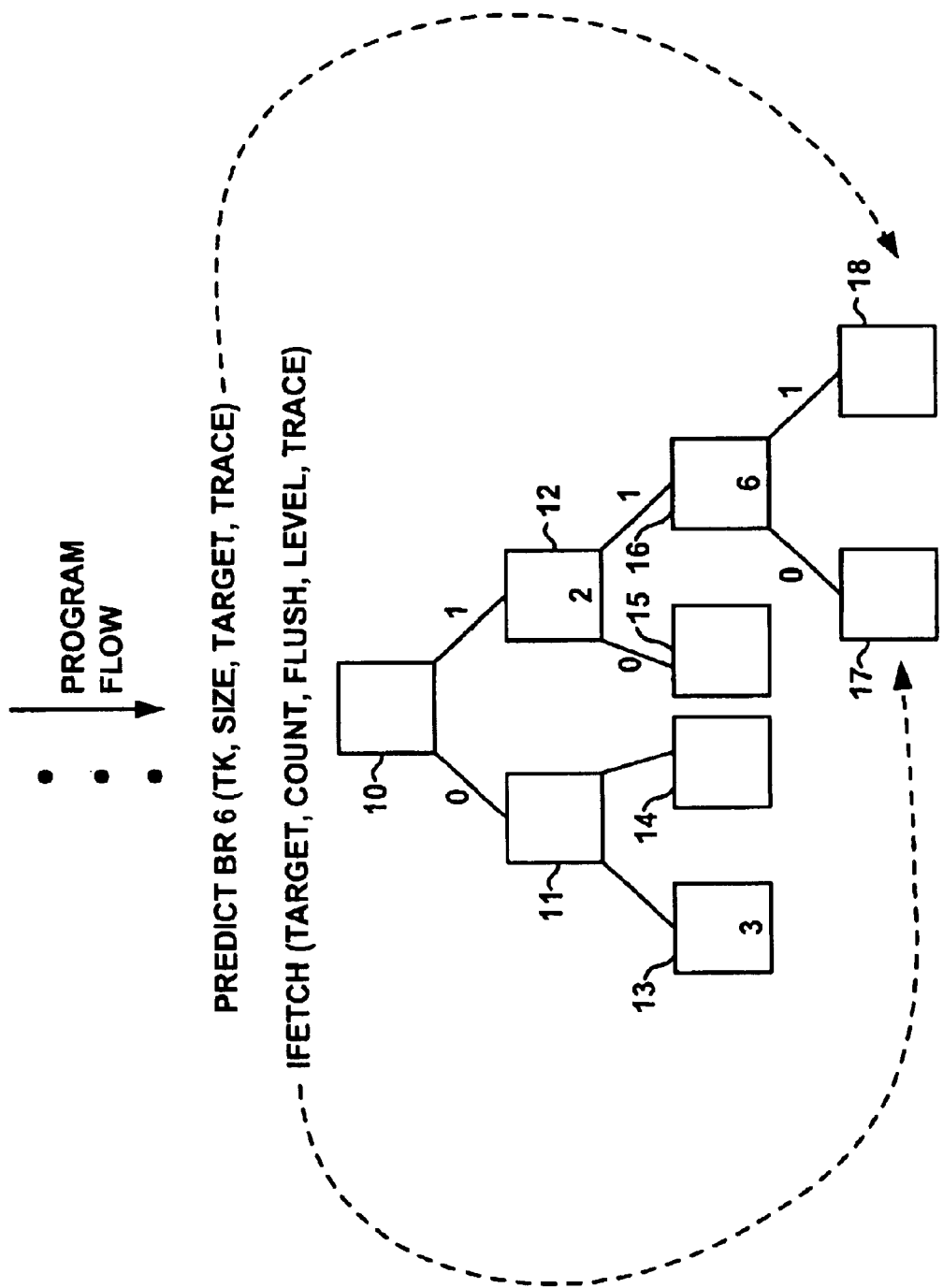
FIG. 1 illustrates a prefetch instruction of the present invention, a branch predict instruction disclosed in U.S. Pat. No. 5,742,804, and a programmed sequence of instructions which are shown in FIG. 1 as an instruction flow tree.

The present invention provides a prefetch instruction capable of prefetching instructions into one or more levels of cache memory. In the following description, numerous specific details are set forth, such as particular information fields, processor structures, encodings, etc., in order to provide a thorough understanding of the present invention. It should be understood, however, that these specific details need not be used to practice the present invention. In other instances, well known structures, circuits, methods. etc., have not been shown in detail to avoid obscuring the invention.

Before discussing the present invention in greater detail below, first consider U.S. Pat. No. 5,742,804 to Yeh et al., which is entitled "Instruction Prefetch Mechanism Utilizing a Branch Predict Instruction" and was incorporated by reference above. Yeh et al. disclosed a branch predict having the format:

Predict BR_ADDR (TK,size,target,trace)

This instruction exposed the branch prediction mechanism of the processor to the compiler by allowing the compiler to provide a branch prediction for an upcoming branch instruction located at the address specified by the BR_ADDR field of the instruction. Whether the branch was to be taken was encoded into the TK field of the instruction.

When executed, the branch predict instruction disclosed by Yeh et al. also started prefetching instructions beginning at the address specified in the target field. Accordingly, when program execution reached the presaged branch instruction, the branch instruction would have already been fetched into the instruction cache and the processor had a prediction provided by the compiler indicating whether the branch should be predicted as taken.

In addition to the BR_ADDR, TK, and target fields, the branch predict instruction included a size field to indicate whether additional instructions should be executed. The size field was encoded as a single bit and simply indicated whether the basic block of code associated with the branch target was "small" or "large". If the basic block was large, an implementation dependant streaming prefetch operation was commenced, which handled subsequent prefetches in a sequential manner. Alternatively, if the basic block was small, only a small implementation dependant number of additional prefetches were performed.

U.S. Pat. No. 5,742,804 did recognize "that the size field can benefit from more bits, if they [are] available, because the exact number of instructions to fetch can then be measured more accurately." However, because of the other fields required in the branch predict instruction, only a single bit was available to encode the size field.

While the present invention is not limited by the following statement, the prefetch instruction of the present invention is provided in a common instruction set with the branch prediction instruction disclosed by Yeh et al. Note that Yeh et al. and the present invention share a common inventor, Dale Morris.

Yeh et al. linked the branch prediction mechanism of a processor to the instruction prefetch mechanism, thereby exposing both mechanisms to the compiler via a single branch prediction instruction. However, it was not apparent to the implementors of the instruction set containing the branch predict instruction that additional performance gains could be achieved by separating the exposure of the branch predict mechanism to the compiler from the exposure of the instruction prefetch mechanism to the compiler.

The inventors of the present invention discovered that by providing a separate prefetch instruction, useful prefetching could be performed in situations where it would otherwise be impossible using the branch predict instruction disclosed by Yeh et al. For example, consider a branch instruction that has an even chance of being taken. The branch predict instruction disclosed by Yeh et al. can prefetch along the predicted path from the branch instruction, but not the other path. In a processor that can speculatively execute both paths, and discard the results of an incorrectly predicted path, the prefetch instruction of the present invention can also prefetch along the path that will not be predicted as taken, thereby enhancing the speculative execution along both paths.

Another example where the prefetch instruction is useful is in a situation where a loop is executed a large number of times. Of course, the branch instruction that forms the loop will be predicted as taken, and the branch predict instruction can prefetch that instructions that comprise the loop. However, consider what happens when the loop terminates. A new basic block of instructions will be executed, but the branch predict instruction disclosed by Yeh et al. is unable to initiate prefetching of the instructions in the new basic block. And yet, the compiler may be able to provide valuable information regarding how the instructions in the new basic block should be prefetched. The prefetch instruction of the present invention can fill this void.

Finally, consider a segment of code that includes many basic blocks having a low probability of execution, yet all these basic blocks converge at common basic block that has a high probability of execution. Prefetching all the low probability basic blocks will pollute the cache with a lot of instructions that will not be executed, so it is advantageous not to prefetch these basic block. However, the common basic block should be prefetched, since it will probably be executed. The present invention provides a mechanism for accomplishing this.

The prefetch instruction of the present invention also allows the number of instructions to be prefetched to be specified via a count field, as will be discussed in greater detail below. In the branch predict instruction disclosed by Yeh et al., the OP code only had enough space to encode the size of the field as a single bit. However, the prefetch instruction of the present invention does not include a branch instruction address and branch prediction information, so there is space in the OP code to include a count field. By including a count field, it is possible for the compiler to prefetch only those instructions that are likely to be needed. In contrast, the imprecise nature of the size field of the branch instruction disclosed by Yeh et al. may result in fetching too few instructions (thereby increasing latency as additional instructions need to be fetched) or may result in fetching too many instructions (thereby using valuable bandwidth and increasing cache pollution). Therefore, a compiler may even find it advantageous to use the branch predict instruction of Yeh et al. with the prefetch instruction of the present invention. For example, the compiler can emit a branch predict instruction to predict an upcoming branch instruction, with the size field set to "small", and thereafter emit a prefetch instruction that prefetches the exact number of instructions contained in the basic block following the branch instruction.

In one embodiment of the present invention, the prefetch instruction is encoded as:

IFETCH (target, count, flush, level, trace)

The target field specifies address at which prefetching should begin, the count field specifies the number of instructions to prefetch, the flush field indicates whether earlier prefetches should be discarded and whether in-progress prefetches should be aborted, the level field specifies the level of the cache into which the instructions should be prefetched, and the trace field establishes a trace vector that can be used to determine whether the prefetching operation specified by the instruction should be aborted.

Referring to FIG. 1, there is shown a prefetch instruction in accordance with the present invention, along with branch predict instruction disclosed by Yeh et al. Note that FIG. 1 is somewhat similar to FIG. 1 of Yeh et al. The prefetch instruction and the branch predict instruction have been inserted into a programmed sequence of instructions, which are shown in FIG. 1 as an instruction flow tree. Both instructions assist in the instruction prefetch by providing information regarding the instructions that are actually encountered by the "front-end" of the processor. (The term "front-end" refers to the instruction fetching and decoding hardware of the processor, whereas the term "back-end" refers to the operations associated with the execution and retirement of instructions in a computer program.) The branch predict instruction prepares the operation of the branch prediction circuitry in the processor so that when the branch is encountered in the program flow, the information required to make the prediction is available. Instruction flow can therefore continue without incurring a stall or miss penalty.

Practitioners skilled in the art of computer programming and computer architecture will appreciate that neither the prefetch instruction of the present invention nor the branch predict instruction changes the architectural state of the processor. Both instructions simply pass down static information from the compiler to the processor.

In the back-end of the processor, where instructions are executed and the architectural state of the machine is updated, the prefetch instruction and the branch predict instruction are simply treated as a no-operation (NOP) instructions. Included within both instructions are various opcode fields that are used to encode necessary information that is passed from the compiler to the processor.

In FIG. 1, each of the labeled squares represent a basic block of instructions that end with a branch instruction that has also been labeled. A basic block of instructions is a contiguous sequence of instructions that may be stored, for example, in a random-access memory (RAM) device. For prefetching considerations, it is desirable to move the prefetch instruction and the branch predict instruction as far back from the target basic block as reasonable. This is because prefetching most often occurs from main memory to an on-chip cache, and it is desirable to provide enough time to fetch the instructions without incurring a stall.

To understand how the prefetch instruction of the present invention can enhance execution efficiency, consider that the compiler determines that branch instruction 6 at the end of basic block 16 has a 60% chance of branching to basic block 18 and a 40% chance of falling through to basic block 17. The compiler will emit a branch predict instruction as shown in FIG. 1 to predict that branch 6 will be taken to block 18, and the instructions at the beginning of basic block 18 will be prefetched. However, there is also a good chance (40%) that branch 6 will not be taken, and the demand miss penalty associated with not having basic block 17 prefetched may be high. To avoid this, the compiler emits a prefetch instruction in accordance with the present invention. Assume that basic block 17 is structured as follows:

| Basic Block 17 | |
| --- | --- |
| Start: | Instruction 1 |
| | Instruction 2 |
| | . |
| | . |
| | . |
| | Instruction 25 |
| End: | Instruction 26 |

The corresponding prefetch instruction would be:
IFETCH (target=start, count=26, flush, level, trace)
Note that besides the target and count fields, there are three fields that were discussed briefly above. These fields are the flush, level, and trace fields. The level field indicates the cache level into which the instructions are to be prefetched. As used herein, level 0 refers to cache closest to the processor. Typically this will be an instruction cache on the same die as the processor, and as instructions are fetched into the instruction cache, the instructions may be partially decoded. A level 1 cache may be on the same die as the processor, or may be provided by the chipset on the system board. Furthermore, the level 1 cache may be an instruction cache, or a combined instruction/data cache. Of course, second and third level caches are also known in the art. Typically, as caches are placed closer to the processor, they become smaller, but faster. In the example above, where basic block 17 has a 40% chance of being executed, a compiler would probably elect to have basic block 17 prefetched into the level 0 cache. Accordingly, the instruction would be encoded as:

IFETCH (target=start, count=26, flush, level=0, trace)

However, now assume that basic branch 17 only has a 10% chance of being executed. The compiler needs to balance the tradeoff between prefetching basic branch 17 into the level 0 cache with the cache pollution that will likely occur by prefetching instructions that are unlikely to be executed. One way of striking the proper balance is to only prefetch basic block 17 into the level 1 cache, but not the level 0 cache. While the latency associated with moving basic block 17 form the level 1 cache to the level 0 cache will be greater than if block 17 were prefetched directly into the level 0 cache, the latency will still be much less than fetching block 17 from main memory. Therefore, the compiler may decide to encode the instruction as:

IFETCH (target=start, count=26, flush, level=1, trace)

The trace field serves substantially the same function as the trace field of the branch predict instruction disclosed by Yeh et al. In the example shown in FIG. 1, if the program actually flows down the path to branch 6, the correct instructions have been prefetched. However, consider what would happen if branch 2 at the end of basic block 12 fell through to basic block 15. At this point, it is known that the prefetching of basic blocks 17 and 18 by the branch predict instruction and the instruction prefetch instruction, respectively, is not required. However, if the prefetching continues, bandwidth is wasted and the cache is polluted.

For optimum performance, these prefetching requests should be canceled. In one embodiment of the present invention, a prefetch request cancellation policy is implemented by encoding a trace vector. The trace vector indicates the path from the point where the prefetch instruction is located to the target block. This trace vector may be encoded as a 3-bit field indicating that from the point that the prefetch instruction is executed to the target, there are two branch instructions that must be taken to stay on the path along which the prefetches are valid. Accordingly, an appropriate trace vector encoding for the prefetch instruction above would be:

IFETCH (target=start, count=26, flush, level=0, trace=1/1)

Therefore, if either branch 2 of basic block 12 or branch 6 of basic block 16 are not taken, the prefetching can be aborted. Also note that the trace field can be used to invalidate any prefetches that have already been completed by marking these prefetched instructions in the cache as invalid or replaceable, thereby "undoing" some of the cache pollution caused by the incorrect prefetches.

The three bits that are utilized for encoding trace vectors provide encodings for two branch levels of the programming path. The third bit is a "don't care" condition bit that is used in situations where "forks" or "merges" occur in the programming path, and it is not desirable to invalidate the prefetches. Note that by encoding additional bits in the trace field, additional branch levels can be encoded in the trace.

Figure 2:
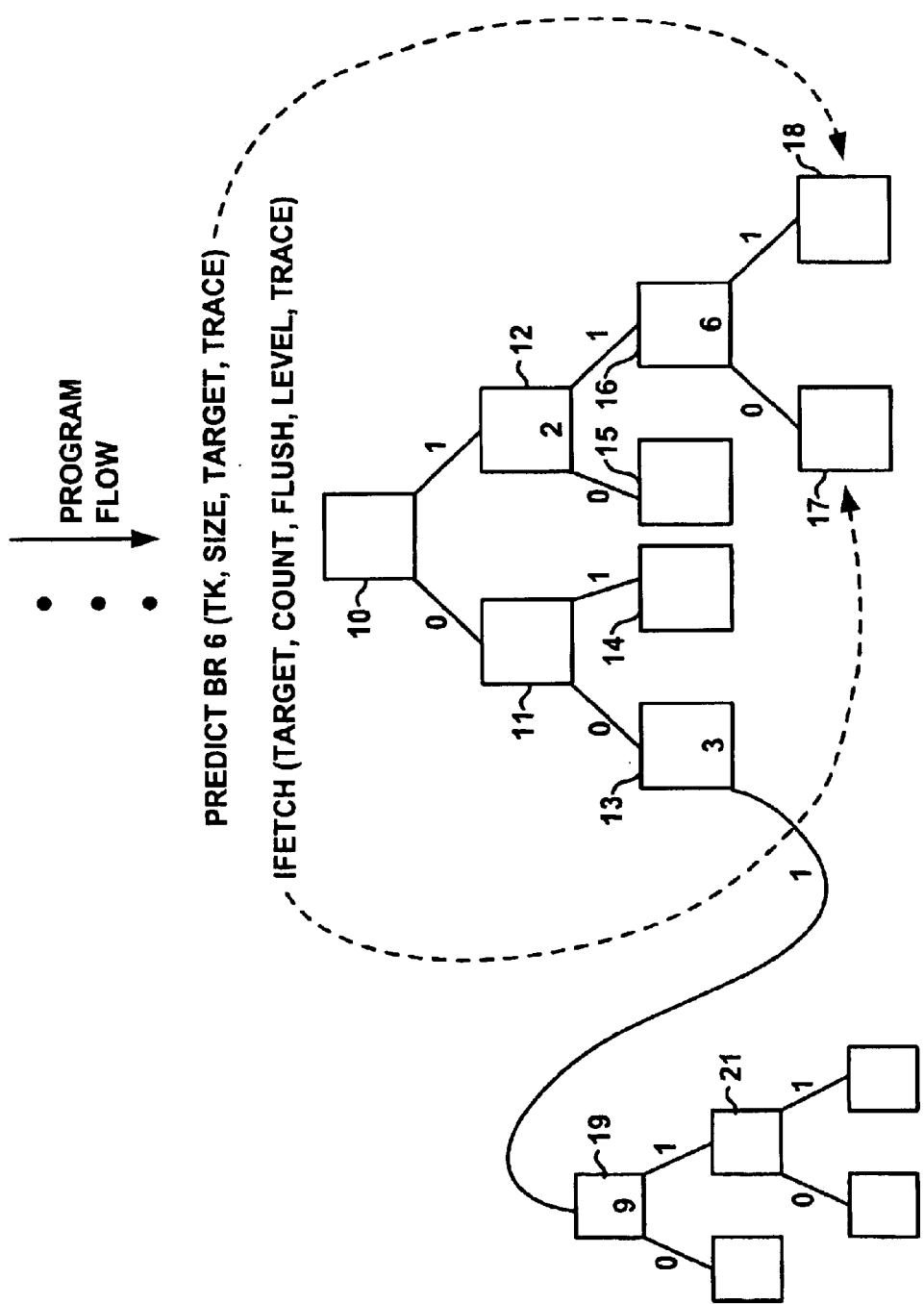
FIG. 2 includes the instructions shown in FIG. 1, and a branch to an unrelated set of basic blocks of instructions.

The trace field only applies to prefetch requests initiated by the instruction in which the trace field is specified. All other prefetch operations specified by other branch predict instructions and prefetch instructions are not affected. Now consider what happens when a low probability branch instruction is taken to a completely different segment of code. This situation is illustrated in FIG. 2, where branch 3 is taken from basic block 13 to basic block 19. In this situation, all of the prefetching operations that were initiated in basic blocks 10–18 will be useless, and the compiler knows this. Of course, some of the prefetching operations may have been terminated via application of the trace fields. However, in one embodiment, the trace fields are only capable of encoding two branch levels. Furthermore, some of the trace fields may have been encoded as "don't care", as described above. This is where the flush field can be used to enhance execution efficiency by aborting all pending prefetch operations, including those requested by prefetch instructions and branch predict instructions. Assume that basic block 19 includes 16 instructions, and ends with an unconditional branch 9 that branches to block 21. Accordingly, the compiler can schedule basic block 19 as follows:

| | Basic Block 19 |
|---|---|
| Block 19: | IFETCH (target = target1, count = 15, flush = 1, level = 0, trace = X) |
| Target1: | PREDICT BR 9 (TK = taken, size, target = Block21, trace) |
| | . |
| | . |
| | . |
| | Instruction 15 |
| BR 9: | BR Block 21 |

This example illustrates two of the advantages provided by prefetch instruction of the present invention compared with the branch predict instruction disclosed by Yeh et al. First, since the branch from basic block 3 to basic block 19 had a low probability of being taken, the compiler would not have predicted it and no prefetching of basic block 19 would have occurred. By including a prefetch instruction as the first instruction of basic block 19, prefetching of the remaining 15 instructions in the basic block can begin as soon as possible. Accordingly, the present invention provides prefetching in situations were "you don't know if you should prefetch until you get there".

Also, since it is known that all prefetching operations requested in basic blocks 10 –18 are no longer needed, by setting flush equal to "1" all pending prefetch operations can be discarded, thereby conserving bandwidth, eliminating further cache pollution, and freeing the prefetch mechanism to receive new prefetch requests. Furthermore, any prefetches that have already been completed can be discarded by marking these prefetched instructions in the cache as invalid or replaceable, thereby "undoing" some of the cache pollution caused by the incorrect prefetches. Also, since it is known that all instructions in basic block 19 will be executed, level has been set to "0" to prefetch basic block 19 into the level 0 cache, and trace has been set to "don't care" since there are no intervening branch instructions that could effect the validity of the prefetch operation. Note that the second instruction is a branch predict instruction that predicts the branch to block 21 at BR 9 and begins prefetching block 21.

One final note, Yeh et al. disclosed that:

Practitioners will also appreciate that the method of the present invention is useful for both "instruction pointer relative" branches as well as "indirect" branches. Instruction pointer relative branches calculate target addresses using simple adders from the instruction itself. Indirect branches, on the other hand, store the target address in a branch register. This information is not known from the instruction itself, since the instruction only provides an index to the branch register. This means that an extra operation must be performed to read the value from the branch register to obtain the target address. However, all the hint information stated previously for the branch predict instruction can be encoded in the "MOV to BR" instruction, which can be used in the same way to prefetch instructions from the target of an indirect branch.

As discussed above, Yeh et al. only had a single bit available in the branch predict OP code to encode the size field, whereas the prefetch instruction of the present invention has sufficient bits available to encode a count field that precisely specifies the number of instructions to prefetch. In one embodiment of the present invention, three instructions are included in an instruction bundle, and seven bits are available in the prefetch instruction to encode the count field, thereby allowing up to 128 bundles (or alternatively, 384 instructions) to be prefetched. In addition, in this embodiment the prefetch instruction of the present invention includes a single bit to encode the flush field and a single bit to encode the cache level field (thereby allowing instructions to be prefetched to either the level 0 or level 1 cache). These additional encodings are possible because the prefetch instruction does not need to include the address of a branch instruction and a branch prediction.

The "MOV to BR" instructiondoes not include the addres of branch instruction. Nor does it include a branch prediction. Accordingly, the OP code of the "MOV to BR" has sufficient space to allow enconding of the count, flush, and level fields of the of prefetch instruction of the present invention. Accodingly,in another embodiment of the present invention, a "MOV to BR" instruction is provide as follows:

MOV_TO_BR.IFETCH B1=R2 (count, flush, level, trace)

In this instruction, R2 specifies the source general register, B1 specifies the destination branch register, and the count, flush, level, and trace fields function as described above.

Although the present invention has been described with reference to preferred embodiments, workers skilled in the art will recognize that changes may be made in form and detail without departing from the spirit and scope of the invention.

What is claimed is:

1. A computer readable medium containing executable instructions which, when executed in a processing system, causes the system to prefetch instructions into a cache memory, comprising:

a branch predict instruction for predicting a branch and prefetching an instruction of a predicted path from said branch;

a prefetch instruction for prefetching an instruction of an unpredicted path from said branch, said prefetch instruction does not include a branch instruction address and branch prediction information, said prefetch instruction comprising:

a target field for specifying an address at which prefetching begins;

a count field for specifying a number of instructions to prefetch;

a cache level field for specifying a level of cache into which the instructions are to be stored;

a trace field for, establishing a trace vector; and a flush field for indicating whether earlier prefetches are to be discarded and whether in-progress prefetches are to be aborted;

wherein said branch predict instruction and said prefetch instruction are separately emitted by a compiler, said branch predict instruction and said prefetch instruction are inserted into a programmed sequence of instructions, said branch predict instruction and said prefetch instruction do not change an architectural state of a processor, said branch predict instruction and said prefetch instruction pass static information from said compiler to said processor.

2. The computer readable medium of claim 1, wherein:

said branch predict instruction prefetches instructions that comprise a loop; and said prefetch instruction prefetches instructions that execute when said loop terminates.

3. The computer readable medium of claim 1, wherein said branch predict instruction and said prefetch instruction are treated as no-operation (NOP) instructions.

4. The computer readable medium of claim 1, wherein said cache level field specifies a cache that is on the same die as a processor.

5. The computer readable medium of claim 1, wherein said cache level field specifies an instruction cache.

6. The computer readable medium of claim 1, wherein said cache level field specifies a cache on a system board.

7. The computer readable medium of claim 1, wherein said cache level field specifies a combined instruction/data cache.

8. The computer readable medium of claim 1, wherein said trace vector is encoded as a 3-bit field.

9. The computer readable medium of claim 8, wherein said 3-bit field comprises a "don't care" bit.

10. The computer readable medium of claim 1, wherein said trace field only applies to prefetch requests initiated by said prefetch instruction.

11. A computer readable medium containing executable instructions which, when executed in a processing system, causes the system to prefetch instructions into a cache memory, comprising:

a branch predict instruction for predicting a branch instruction and for prefetching an instruction along a predicted path from said branch instruction to a first cache having a first level;

a prefetch instruction for prefetching an instruction along an unpredicted path from said branch instruction to a second cache having a second level, said prefetch instruction does not include a branch instruction address and branch prediction information, said prefetch instruction comprising:

a target field for specifying an address at which prefetching begins;

a count field for specifying a number of instructions to prefetch;

a cache level field for specifying a level of cache into which the instructions are to be stored;

a trace field for establishing a trace vector; and a flush field;

wherein said branch predict instruction and said prefetch instruction are separately emitted by a compiler, said branch predict instruction and said prefetch instruction are inserted into a programmed sequence of instructions, said branch predict instruction and said prefetch instruction fail to change an architectural state of a processor, said branch predict instruction and said prefetch instruction pass static information from said compiler to said processor.

12. The computer readable medium of claim 11, wherein:

said branch predict instruction prefetches instructions that comprise a loop; and said prefetch instruction prefetches instructions that execute when said loop terminates.

13. The computer readable medium of claim 11, wherein said branch predict instruction and said prefetch instruction are treated as no-operation (NOP) instructions.

14. The computer readable medium of claim 13, wherein said cache level field specifies a cache that is on the same die as a processor.

15. The computer readable medium of claim 13, wherein said cache level field specifies an instruction cache.

16. The computer readable medium of claim 13, wherein said cache level field specifies a cache on a system board.

17. The computer readable medium of claim 13, wherein said cache level field specifies a combined instruction/data cache.

18. The computer readable medium of claim 13, wherein said flush field for indicating whether earlier prefetches are to be discarded and whether in-progress prefetches are to be aborted.

19. The computer readable medium of claim 18, wherein said second cache has a latency that is greater than a latency of said first cache.

20. The computer readable medium of claim 19, wherein said trace field only applies to prefetch requests initiated by said prefetch instruction.

* * * * *